Aug. 1, 1961 H. E. MERRITT 2,994,277
FORM AND METHODS OF MANUFACTURE OF ROTORS FOR FLUID PUMPS
Filed Feb. 11, 1957 5 Sheets-Sheet 1

Inventor
HENRY EDWARD MERRITT

By
Mason, Fenwick & Lawrence
Attorneys

Aug. 1, 1961 H. E. MERRITT 2,994,277
FORM AND METHODS OF MANUFACTURE OF ROTORS FOR FLUID PUMPS
Filed Feb. 11, 1957

Inventor
HENRY EDWARD MERRITT

Inventor
HENRY EDWARD MERRITT

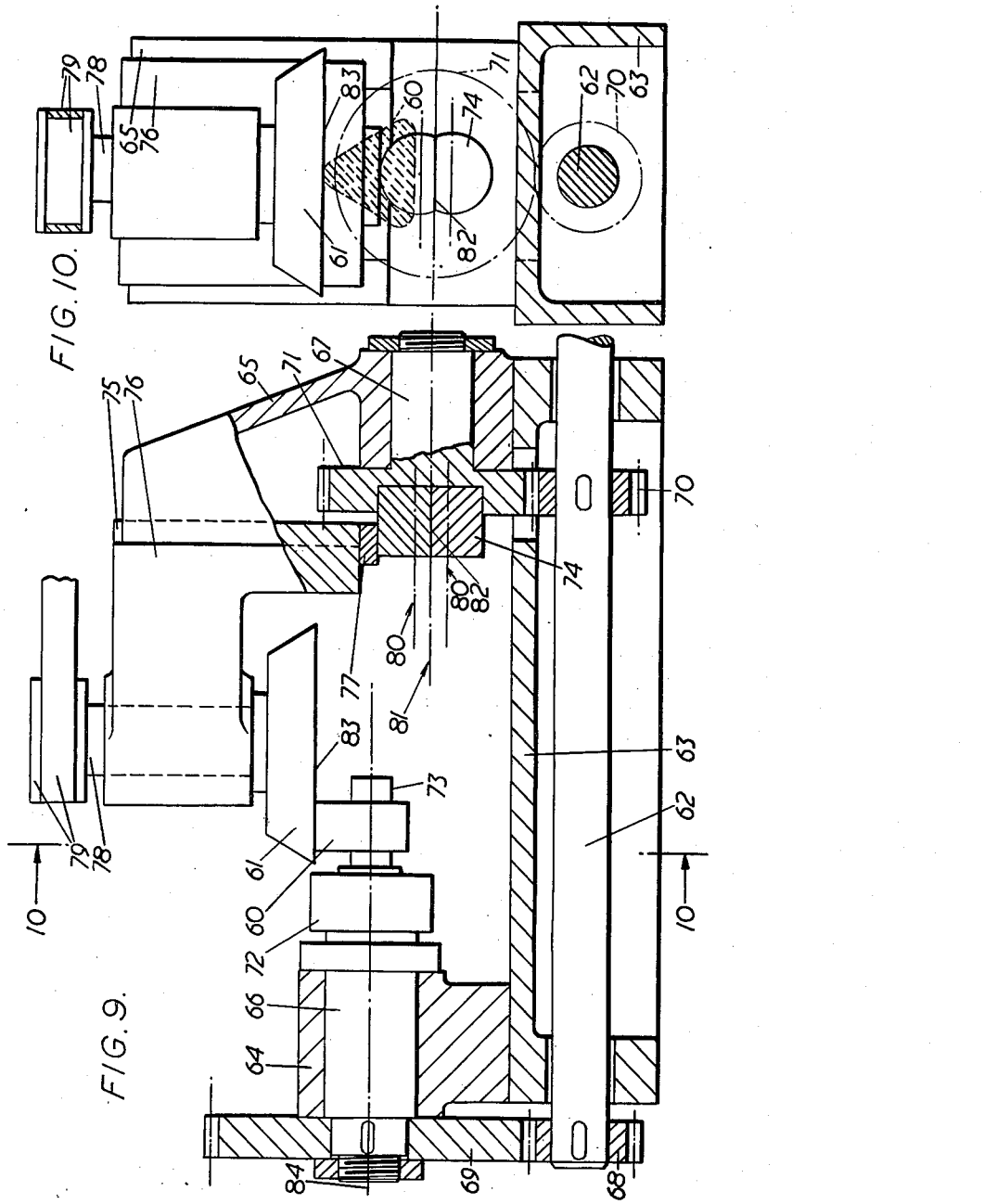

2,994,277
FORM AND METHODS OF MANUFACTURE OF ROTORS FOR FLUID PUMPS

Henry Edward Merritt, Lion Hill, Claverdon, Warwickshire, England
Filed Feb. 11, 1957, Ser. No. 639,274
4 Claims. (Cl. 103—126)

This invention relates to the type of fluid pump in which a pair of rotors, provided respectively with external and internal teeth or lobes differing in number by one, and of a form giving continuous theoretical contact, are meshed together in a suitable housing in such manner that they form closed pumping chambers which, during rotation of the rotors, continuously vary in volume and, during periods of increasing and diminishing volume, the chambers are brought successively into communication with inlet and discharge passages, respectively.

The object of the present invention is to provide for the rotors of such pumps forms of gear teeth capable of accurate and economical manufacture.

In this specification the externally toothed rotor is called a "pinion" and the internally toothed rotor is called an "annulus." The words "odontically conjugate" apply to the form of the teeth of any two inter-engaging toothed rotors in which one of the rotors, rotating with uniform angular velocity, transmits uniform angular velocity to the other rotor. The words "generating line" means a line the envelope whereof in successive positions defines the profile of the curve odontically conjugate to it.

The invention is a fluid pump of the type stated comprising a pinion having three teeth with curved crests and an annulus having four teeth characterised in that the adjoining sides of the pinion between the crests of each two teeth together form a portion of one side of an equilateral triangle concentric with the axis of rotation of the pinion.

Otherwise regarded, the invention also is a fluid pump of the type stated comprising a pinion having three teeth and an annulus having four teeth characterised in that the pinion is a body in the form of an equilateral triangle except that its straight sides merge into convex curves forming the crests of the pinion teeth.

The straight sides of the pinion teeth may be derived from a basic equilateral triangle to the sides of which the pinion sides are parallel.

The crest profile of each tooth of the annulus is a noncircular convex curve derived from a straight generating line corresponding to the straight sides of the pinion teeth.

The crest curve of each tooth of the pinion is derived from a straight generating line in such a manner as to be odontically conjugate to the curved crest profiles of the annulus teeth.

The invention may also include improved manufacturing processes which can be employed to generate the contours of the teeth of the rotors.

The invention is illustrated by the accompanying drawings, which show an example of the pump and its rotors and machines that can be used in their manufacture. In the drawings.

Figure 8:
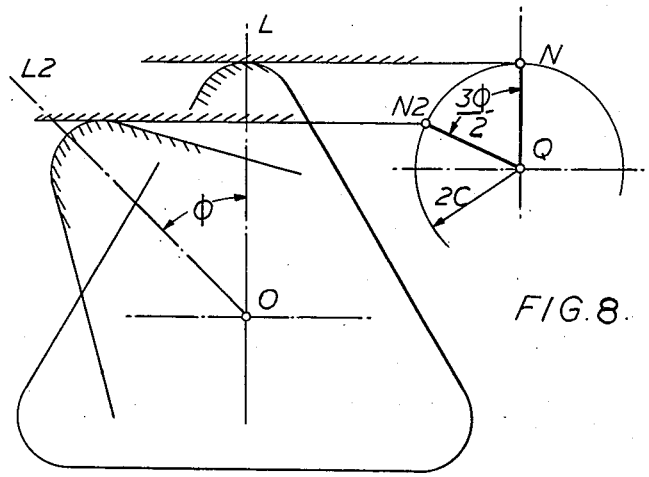
FIG. 8 is a diagram of a kinematic inversion of the procedure according to FIG. 7.

FIGS. 9 and 10, respectively, are a sectional side elevation and a sectional end elevation, approximately on the line 10—10 of FIG. 9, of a machine for generating the pinion teeth profiles in accordance with the concept illustrated by FIG. 8.

Figure 1:
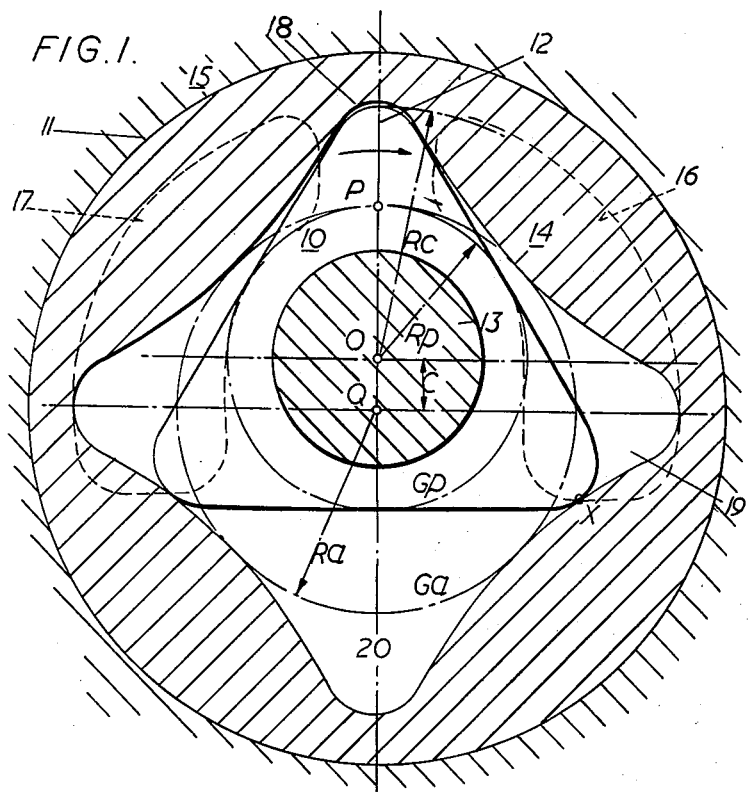
FIG. 1 is a diagrammatic sectional elevation of the pump.

Referring to FIG. 1, the pump comprises a pinion 10 as its inner rotor and an annulus 11 as its outer rotor. The pinion has three external teeth 12 and it is rotatable clockwise with a shaft 13 on which it is formed and the axis of which is indicated by O. The annulus has four teeth 14 and it is rotatable clockwise about an axis Q in timed relationship with the pinion. The two are spaced apart to an extent indicated by C in FIG. 1. The rotors are contained in a casing 15 which is formed with an inlet passage 16 and an outlet passage 17. Thus, during rotation of the rotors 10 and 11, the pumping chambers formed by the inter-meshing teeth 12 and 14 increase continuously from the minimum volume at 18, through an intermediate volume at 19 to the maximum volume at 20 while in communication with the inlet passage 16, whereas conversely they decrease continuously from the maximum to the minimum volume while in communication with the outlet passage 17.

It will be noted that the pinion 10 is in effect an equilateral triangle with curved apexes represented by the crests of the teeth 12.

In FIG. 1, the pitch circles of the pinion and annulus are indicated by $G_p$ and $G_a$, respectively, and the radii of these circles are indicated by $R_p$ and $R_a$. These pitch circles make contact at the point P. The crest circle of the pinion teeth 12 has the radius $R_c$. The pinion pitch-circle radius $R_p$ equals 3C and the annulus pitch-circle radius $R_a$ equals 4C. It is notable that, in the example the root circle of the pinion teeth is coincident with the pinion pitch-circle $G_p$ and the crest circle of the annulus teeth 14 is coincident with the annulus pitch circle $G_a$.

Figure 2:
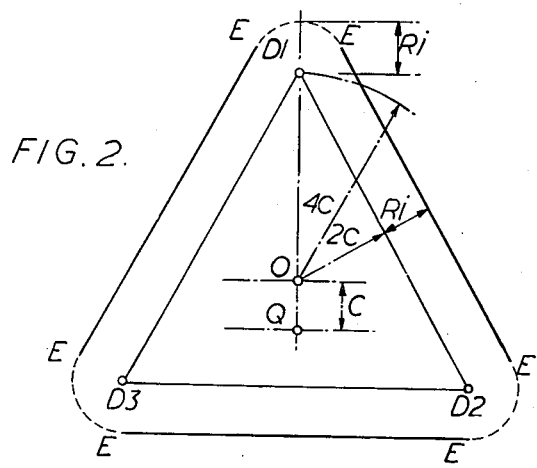
FIG. 2 is a diagram illustrating the determination of the rectilinear portions of the pinion teeth contours.

One of the conditions that must exist if continuous theoretical contact is to be possible between the inter-meshing teeth 12 and 14 is that the radius $R_c$ of the pinion crest circle must exceed the root circle radius $R_p$ by the amount 2C. This relationship will be satisfied, as in the example, by adopting as a basis for the triangular pinion 10 the equilateral triangle which is shown in FIG. 2 and of which the apexes D1, D2 and D3 lie on a circle of radius OD1 equal to 4C, since by the geometrical properties of such a triangle the radius from O to the midpoint of each side is equal to ½OD1 namely 2C. This basic triangle is adopted to give the teeth of the pinion 10 a contour comprising three straight lines EE parallel to the sides of the basic triangle and spaced radially outwards therefrom by an arbitrary radial distance $R_i$, as shown in FIG. 2. The curved crests of the pinion teeth are shown in dotted lines in FIG. 2; a procedure for determining the contour of each crest curve will be described later herein. As indicated in FIG. 2, the pinion teeth crests also extend to a distance $R_i$ radially beyond the apexes D1, D2 and D3 of the basic equilateral triangle, thereby preserving the necessary difference 2C between the pinion crest circle radius $R_c$, namely $4C - R_i$, and the root circle radius $R_p$, namely $2C - R_i$.

The already mentioned coincidences between the root and pitch circles $G_p$ of the pinion teeth 12 and between the crest and pitch circles $G_a$ of the annulus teeth 14 in the example occur because, by way of illustration, the value of $R_i$ has been selected as equal to C. In practice, the value of R*i* may be chosen within wide limits. The selected value is the practical minimum, because a lower value would result in crest curves which were too "sharp." A value of one-hand-a-half times C is about the optimum. A value as great as 2C is practicable.

It is expedient at this stage to refer to the determination of the contour of the annulus teeth 14. As will be apparent from FIG. 1, each tooth comprises mainly a flattish convex curve; in the adjacent teeth of the annulus, the main convex curves merge into one another through a comparatively small radius concave curve forming the root of the teeth. It is the convex curves that function as the effective contact surfaces in co-operation with the pinion teeth 12, and therefore these curves must be designed so as to be odontically conjugate to the rectilinear portions EE of the pinion teeth.

A procedure of determining the contour of the convex curvature of each annulus tooth will now be described with reference to FIG. 3, in which the curve is indicated by FF and in which the rectilinear portion EE of the pinion is represented as a straight generating line in different positions indicated by PE1 and P2E2. Let it be supposed that the cycle of driving contact between the rotor teeth commences in the datum position in which the straight generating line occupies the position PE1; at this instant (for the configuration illustrated) contact between pinion and annulus teeth takes place at P (which in the example is also the point of contact of the pitch circles G*p* and G*a*, FIG. 1). Let it also be supposed that the pitch circle G*a* of the annulus remains fixed and the pitch circle G*p* of the pinion rolls without slip internally around the pitch circle G*a*; the centre of pitch circle G*p*, initially at O, will move around a circle having its centre at Q and a radius equal to C. In a typical position corresponding to roll of the pinion through an angle $\theta$, the centre of pitch circle G*p* has moved to O2; the point of rolling contact between the pitch circles has moved to H; the rolling pitch circle occupies position G*p*2; the point of tangency of the straight generating line with G*p*2 has moved from P to P2; the straight generating line initially at PE1 occupies the position P2E2; and the point J at which a line drawn from H perpendicular to the line P2E2 meets this line is a point on the crest curve FF being determined.

The steps described above are repeated for successive positions of the rolling pitch circle G*a*, each step giving another point corresponding to the point J, and the repeated steps constitute a procedure by which the profile FF is determined graphically. The procedure also represents the motions whereby the profile FF may be generated mechanically. Thus a tool, namely a cutter or an abrasive wheel, may be arranged to reciprocate in guides whereby it sweeps out a plane surface represented by the initial straight generating line PE1, and the said guides may simultaneously be given the combined angular motions corresponding to the rolling of circle G*p* around circle G*a*. Such a tool is illustrated diagrammatically by the circle K in FIG. 3; this circle may conveniently have a radius equal to the dimension R*i* shown in FIG. 2. It is desirable that the motion of the tool K along its guides be restricted to the zone in which generating contact with the profile FF is taking place at any instant, and that at a roll angle approximately equal to 60 degrees the centre of the cutter should correspond to, or not pass substantially beyond, a point which corresponds to the point D1 in FIG. 2. In this way interference with the convex profile of the adjoining tooth F2 of the annulus is avoided.

Figure 3:
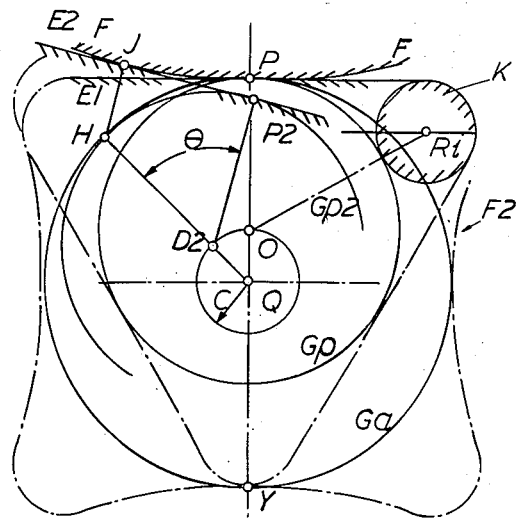
FIG. 3 is a diagram illustrating the determination of the contour of the annulus teeth.
Figure 4:
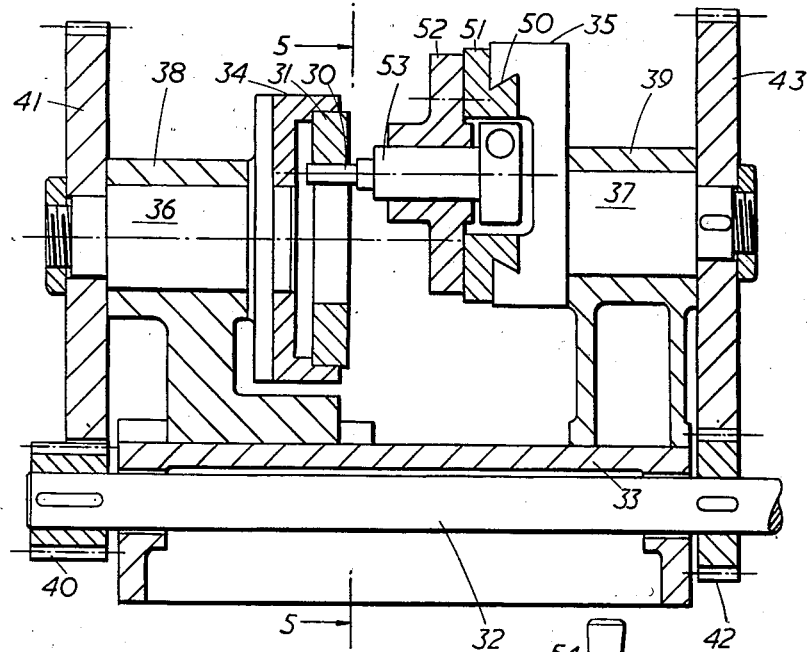
FIG. 4 is a longitudinal mid-section of a machine for performing the procedure illustrated by FIG. 3.
Figure 5:
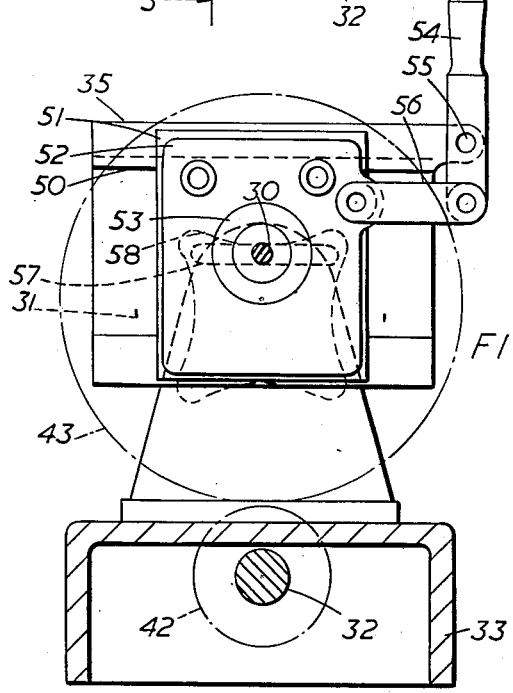
FIG. 5 is a corresponding cross-sectional elevation of the machine, the section being on the line 5—5 of FIG. 4.
Figure 6:
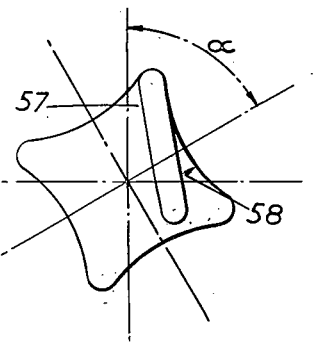
FIG. 6 is a diagram illustrating the path of the tool in relation to the workpiece.

A machine for generating the curved profile FF of each annulus tooth and embodying the concept illustrated diagrammatically by FIG. 3 is shown in a simplified form in FIGS. 4, 5 and 6.

Referring to FIGS. 4 to 6, an abrasive wheel 30 represents the tool K of FIG. 3; the workpiece, namely a blank of the annulus, is indicated by 31. The working parts of the machine are driven from a main shaft 32 rotatable in bearings in the frame 33. The machine has a rotary chuck 34 and a rotary block 35 which respectively carry the workpiece and the tool. These carriers 34, 35 are provided on shafts 36 and 37 which are rotatable in head-stocks 38 and 39 on the frame. The axes of these shafts are eccentric to an adjustable extent equal to the selected value of C, namely the distance between the pump rotors 10 and 11. The shafts 36 and 37 are respectively rotated by the shaft 32 through gear pairs 40, 41 and 42, 43. The pair 40, 41 has a reduction ratio of 4 to 1; the reduction ratio of the other pair 42, 43 is 3 to 1. Thus, in the operation of the machine, the carriers 34 and 35 will rotate with the workpiece and the tool at speeds in the ratio of 3 to 4, namely the speed ratio of the annulus 11 to the pinion 10 in the operation of the pump.

The machine has means for superposing on the rotational motion of the tool 30 a relative rectilinear motion, as described with reference to FIG. 3. Thus, the tool-carrying block 35 has a slideway 50 and a slidable carriage 51 is fitted to this slideway. The carriage has an adjustable fixture 52 which serves as a bearing for a spindle assembly 53. This assembly is a rotary holder of the tool; the assembly incorporates a motor, for instance a compressed air motor, from which the rotary motion is derived. The carriage 51 is given a reciprocating motion in its guideway across the block 35 by any appropriate device; as FIG. 5 shows, this device includes an oscillating lever 54 fulcrumed at 55 in the head-stock 35 and a link 56 between the lever and the carriage.

The fixture 52 is adjustable at right angles to the slideway in accordance with the diametral size of the tool 30. The arrangement is such that the tool 30 will reciprocate in a rectilinear path corresponding to a side DD of the basic equilateral triangle shown in FIG. 2.

Assume that as shown in FIG. 5 the annulus blank 31 is in its "datum" position, i.e. with the axes of symmetry of its teeth respectively vertical and horizontal, and that the slideway 50 is horizontal. The machine is set in operation, the main shaft 32 being rotated slowly and the tool 30 being continuously reciprocated as it rotates in appropriate relationship with and relatively to the blank 31 about the axes of the respective shafts 36 and 37. The action in effect is that the active portion of the tool 30 sweeps out a rectilinear surface coincident with the straight portion of the profile of an imaginary pinion 10 co-axial with the shaft 37. As the work progresses, the convex profile of an annulus tooth is generated.

It will be apparent that the machine according to FIGS. 4 to 6 comprises a rotary holder 34 for a blank 31 of the annulus 11, a rotary holder 35 for a tool 30, the axes of said holders being spaced apart to the same amount C as the pump rotors 10, 11 and the holders being rotated respectively in the ratio of 3 to 4, and means 54—56 for effecting relative reciprocation between the blank holder and the tool holder in a path at right angles to the common plane of said axes.

As already explained with reference to FIG. 3, the length of the stroke of the tool is restricted to ensure that the tool does not touch the profile of either adjoining tooth of the annulus. However, when the annulus has been rotated through an angle $\alpha$, FIG. 6, equal to 60 degrees, the machine is stopped temporarily and the stroke of the tool is increased to a selected amount which will cause the tool to grind out the concave root curve at an end of the effective convex curve being generated; and the machine is re-started. The operation is illustrated by FIGS. 5 and 6, in which 57 indicates the path swept by the tool and 58 the newly generated convex curve. On completion of the root curve, the machine is stopped, the head-stock 38 is withdrawn, the workpiece is turned through 90 degrees, and the procedure repeated, the next tooth thus being generated. The procedure is repeated for the third and fourth teeth, thus completing the annulus.

As previously explained, it is only the convexly curved surfaces of the annulus teeth that function as effective contact surfaces in the action of the pump rotors 10, 11. Thus, it will be apparent that the root contours need simply be smooth curves which give slight clearance in relation to the pinion teeth 12 (as illustrated by FIG. 1, where the rotors form the chamber 18 of minimum volume).

Now that it has been described how to determine the rectilinear portions of the teeth of the pump pinion 10 and also how to determine and produce mechanically the contour of annulus teeth generated so as to be odontically conjugate with said straight portions, it remains to describe a procedure of determining for the pinion teeth the convex crest curves which join the rectilinear portions and means for generating mechanically the pinion tooth contour.

Figure 7:
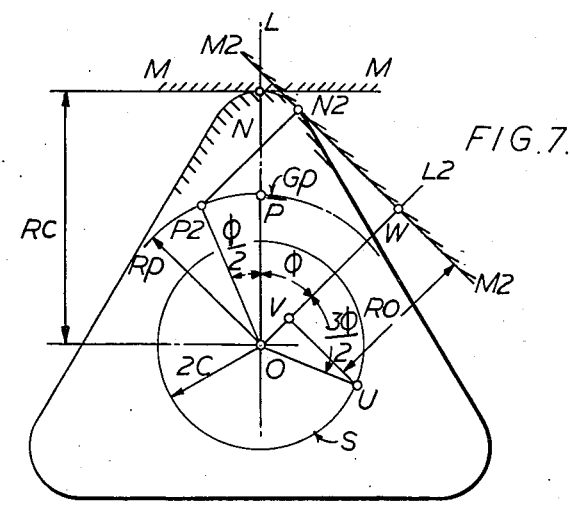
FIG. 7 is a diagram illustrating the determination of the crest curves joining the rectilinear portions of the pinion teeth contours.

As shown in FIG. 7, OL is the radial centre line of a tooth of the pinion, and the straight line MM is a straight generating line in the datum position perpendicular to OL, in which the line touches the crest of the tooth at N. In this position the distance of MM from O is equal to the major radius $Rc$ of the pinion. For constructional purposes there is drawn a circle having centre O and radius equal to 2C; and in this example $Gp$ is the pitch circle of the pinion intersecting the line OL at P.

The procedure for determining a succession of points on the crest profile is as follows. Select arbitrarily a radius OL2 making an angle $\phi$ with the datum radius OL. Draw from centre O a radius OU meeting the circle S at the point U, such that the angle L2OU is equal to $$\frac{3\phi}{2}$$

From U draw a line UV perpendicular to the line OL2. Along this line OL2 set off the length VW, namely $Ro$, equal to $Rc-2C$; and through W draw the line M2M2 perpendicular to OL2. This line M2M2 is the position of the straight generating line corresponding to the angle $\phi$, and the line will touch the required crest curve at the point N2; this point is the end of a line drawn perpendicular to the line M2M2 from a point P2 on the pitch circle $Gp$ lying on a radius OP2 inclined at $$\frac{\phi}{2}$$

from OL.

These steps are repeated for successive values of the angle $\phi$ and this will give a series of points corresponding to N2 on the desired crest curve. The limit value of $\phi$ is 60 degrees, at which angle the straight generating line M2M2 coincides with the rectilinear portion of the tooth profile.

The foregoing procedure described with reference to FIG. 7 may be made the basis of a process whereby the pinion tooth profile may be generated by mechanical means. Preferably, such mechanical means may be embodied in a machine designed to perform a kinematic inversion of the FIG. 7 procedure, this inversion being illustrated diagrammatically by FIG. 8. As shown, a blank of the pinion is mounted to rotate about an axis O through an angle $\phi$ having limits of 60 degrees clockwise and 60 degrees counter-clockwise with respect to the datum position OL. A generating plane, represented in the datum position by the straight line MM in FIG. 7 is swept out by a suitably arranged tool, namely a cutter or an abrasive wheel, and a head carrying the tool is carried in guides whereby it may move in a direction parallel to OL. The head is given simple harmonic motion derived from a crank of radius equal to 2C and connected mechanically to a spindle on which is mounted the blank from which the pinion is to be formed, the crank and spindle being rotated at a constant angular velocity ratio of 3:2. The crank is represented in FIG. 8 in the datum position by QN parallel to OL; at an angular displacement $\phi$ of the pinion blank to the position OL2 the corresponding displacement of the crank is an angle of $$\frac{3\phi}{2}$$

and its position is QN2. The angular motion of the pinion blank is stopped at the limits 60 degrees clockwise and counter-clockwise; in each of these limiting positions the generating plane is coincident with the adjoining rectilinear portion of the pinion tooth profile.

A machine for generating the pinion tooth profiles and embodying the concept described with reference to FIG. 8 is shown in a simplified form in FIGS. 9 and 10. Referring to these figures, the workpiece 60 is the pinion blank, and the tool is a rotary abrasive wheel 61. The machine has a rotary main shaft 62 which rotates in bearings in the frame 63. The machine has two head-stocks 64 and 65 which are both secured to the frame. These head-stocks respectively carry spindles 66 and 67 which are rotated from the main shaft through two gear pairs 68, 69 and 70, 71. The pair 68, 69 have a speed reduction ratio of 3:1, whereas the other pair 70, 71 have a speed reduction ratio of 2:1. Thus, the spindles 66 and 67 are rotated at speeds having the ratio 2:3.

The spindle 66 has a chuck 72 in which the shaft 73 of the workpiece 60 is secured; this shaft is the eventual pinion shaft 13, FIG. 1. The spindle 67 has secured to it a cam 74. The head-stock 65 is formed with a vertical slideway 75 in which is mounted a reciprocating carriage 76, this carriage having an abutment 77 which functions as follower to the cam. The abrasive wheel 61 is carried by a vertical shaft 78 which is journalled in a bearing on the carriage 76; and means (not shown) for vertical adjustment between the wheel 61 and the abutment 77 would be provided. This shaft 78 is rotated by a belt-and-pulley drive 79.

In the example, by way of illustration, the cam 74 is shown made in two parts, representative of two imaginary cylinders the axes 80 of which are each spaced by an amount equal to 2C from the axis 81 of rotation of the cam. Actually, seen that the two imaginary cylinders merge into one another, each part is cut across a chord, thus forming a partly cylindrical body with a flat surface 82, and the two flat surfaces abut as FIG. 10 shows.

The abrasive wheel 61 has a plane working surface 83 to which the axis 84 of rotation of the workpiece 60 is parallel.

When the machine is set in operation, during each complete rise and fall of the abrasive wheel 61 by a rotation through 180° of the cam 74 the workpiece 60 will be turned through the contour of a complete pinion tooth by a rotation through 120° of the workpiece. Thus, in one-and-a-half revolutions of the cam the blank will be ground to form a complete pinion.

It will be apparent that the machine according to FIGS. 9 and 10 comprises a rotary holder 72 for a blank 60 of the pinion 10, a holder 76 for a rotary tool 61 presenting a plane working surface 83, one of said holders being reciprocable relatively to the other in a path at right angles to said plane surface, and a rotary cam 74 for reciprocating the reciprocable holder 76, the active surface of said cam being formed to impart to the reciprocable holder stages of simple harmonic motion spaced in accordance with the distance between the rotor axes and each such stage being timed to generate the profile of one tooth.

It will be manifest that pinion crest profiles generated in the manner described with reference to FIGS. 9 and 10 are odontically conjugate to the convex internal tooth profiles FF, FIG. 3, generated in the manner described with reference to FIGS. 4 to 6, so that theoretically correct tooth contact occurs at a point such as X in FIG. 1 and continues until the point Y in FIG. 2 is reached.

A particular advantage of the equilaterally triangular form of the pinion is that its profile is nowhere concave. Consequently, when the entire profile of the pinion has been determined (say as illustrated by FIGS. 2 and 7) pinions having precisely this profile can be reproduced simply, accurately and economically by any of various known means, notably by means of the machines and techniques currently employed for the profile-grinding of camshafts of internal combustion engines. In such methods one may use as the master cam a pinion generated as illustrated by FIGS. 9 and 10.

The teeth of the annulus may be profile-ground by means of the machine illustrated by FIGS. 4 to 6 or any convenient kinematic inversion thereof. Alternatively, once the profile of the teeth of the annulus has been determined (say as illustrated by FIG. 3) the annulus may be finished by broaching a blank in known manner.

I claim:

1. A fluid pump of the type stated which comprises a pair of rotors respectively having external teeth and internal teeth meshed together, a housing enclosing said rotors and wherein the inter-meshing teeth form closed pumping chambers, and inlet and discharge passages in said housing, said pumping chambers coming successively into communication with said passages during rotation of said rotors, and in which said rotors consist of a pinion having three external teeth with curved crests and an annulus having four internal teeth and in which the sides of the pinion joining the crests are straight, these sides forming portions of the sides of an equilateral triangle concentric with the axis of rotation of the pinion and the effective contour of each tooth of the annulus being determined by a straight generating line corresponding to each of the straight sides of the pinion teeth and being a non-circular curve odontically conjugate to said sides and the crest of each pinion tooth also being determined by a straight generating line corresponding to each of the straight sides of the pinion teeth and being a non-circular curve odontically conjugate to the effective contours of the annulus teeth.

2. A fluid pump of the type stated which comprises a pair of rotors respectively having external teeth and internal teeth meshed together, a housing enclosing said rotors and wherein the inter-meshing teeth form closed pumping chambers, and inlet and discharge passages in said housing, said pumping chambers coming successively into communication with said passages during rotation of said rotors, and in which said rotors consist of a pinion having three external teeth and an annulus having four internal teeth and in which the pinion is a body in the form of an equilateral triangle except that its straight sides merge into non-circular convex curves forming the crests of the pinion teeth, the effective contour of each tooth of the annulus being a curve that is odontically conjugate to the straight sides of the pinion teeth and is determined by a straight generating line of which one position represents each of said sides, and the curvature of each crest also being determined by a straight generating line so as to be odontically conjugate to the effective contours of the annulus teeth.

3. A fluid pump according to claim 2 in which the straight sides of the pinion teeth are derived from a basic equilateral triangle to the sides of which the pinion sides are parallel.

4. A fluid pump of the type stated which comprises a pair of rotors respectively having external teeth and internal teeth meshed together, a housing enclosing said rotors and wherein the inter-meshing teeth form closed pumping chambers, and inlet and discharge passages in said housing, said pumping chambers coming successively into communicaiton with said passages during rotation of said rotors, and in which said rotors consist of a pinion, which is rotatable about an axis and has the form of an equilateral triangle except that its straight sides merge into convex curves forming the crests of the external teeth of the pinion, and an annulus which is rotatable relatively to the pinion about a parallel axis and has four internal teeth, the two axes being at a predetermined distance apart, the effective contour of each tooth of the annulus being generated by displacement of a straight line through positions occupied by each straight side of the pinion teeth in the relative rotation between the pinion and annulus, and the curvature of the pinion crests being generated by progressively effecting displacement relatively to the pinion of a straight generating line to which in all positons thereof a radius from the pinion axis is perpendicular, said line in its limit positions being tangential to the pinion tip and root circles respectively, and simultaneously effecting relative rotation between said line and pinion about the pinion axis to the extent of 120° for each crest during a complete to-and-fro displacement of the generating line between said limit positions, the speeds of displacement and rotation being so co-related that if the relative rotation is at constant angular velocity the displacement of the generating straight line corresponds to one-half of a complete cycle of simple harmonic motion.

References Cited in the file of this patent

UNITED STATES PATENTS

| | | |
|---|---|---|
| 457,294 | Tilden | Aug. 4, 1891 |
| 1,389,189 | Feuerheerd | Aug. 30, 1921 |
| 1,753,476 | Richer | Apr. 8, 1930 |
| 1,833,993 | Hill | Dec. 1, 1931 |
| 1,892,217 | Moineau | Dec. 27, 1932 |
| 2,578,187 | Hill | Dec. 11, 1951 |
| 2,830,542 | Erickson | Apr. 15, 1958 |

FOREIGN PATENTS

| | | |
|---|---|---|
| 683,344 | Germany | Mar. 4, 1939 |